UNITED STATES PATENT OFFICE.

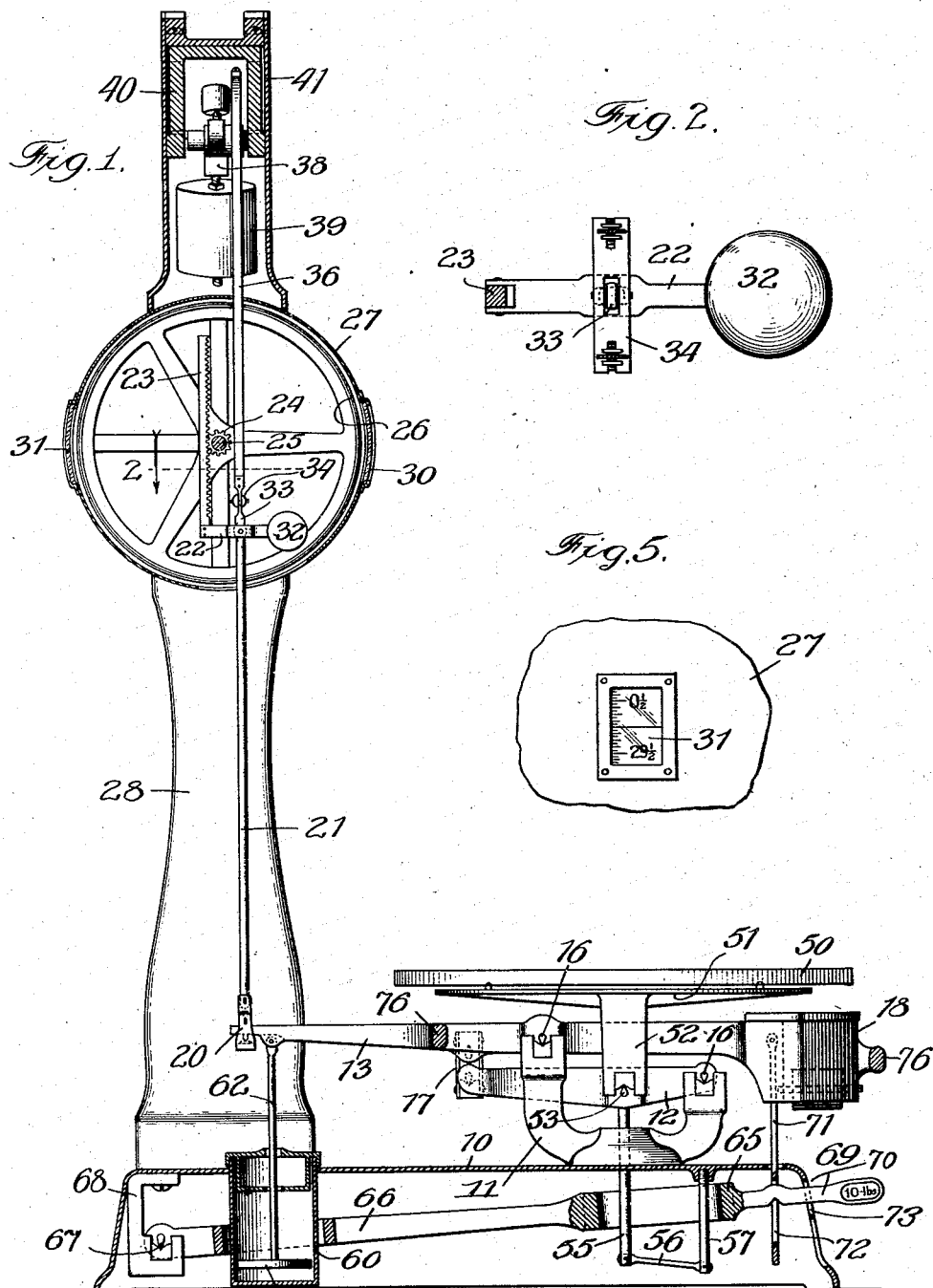

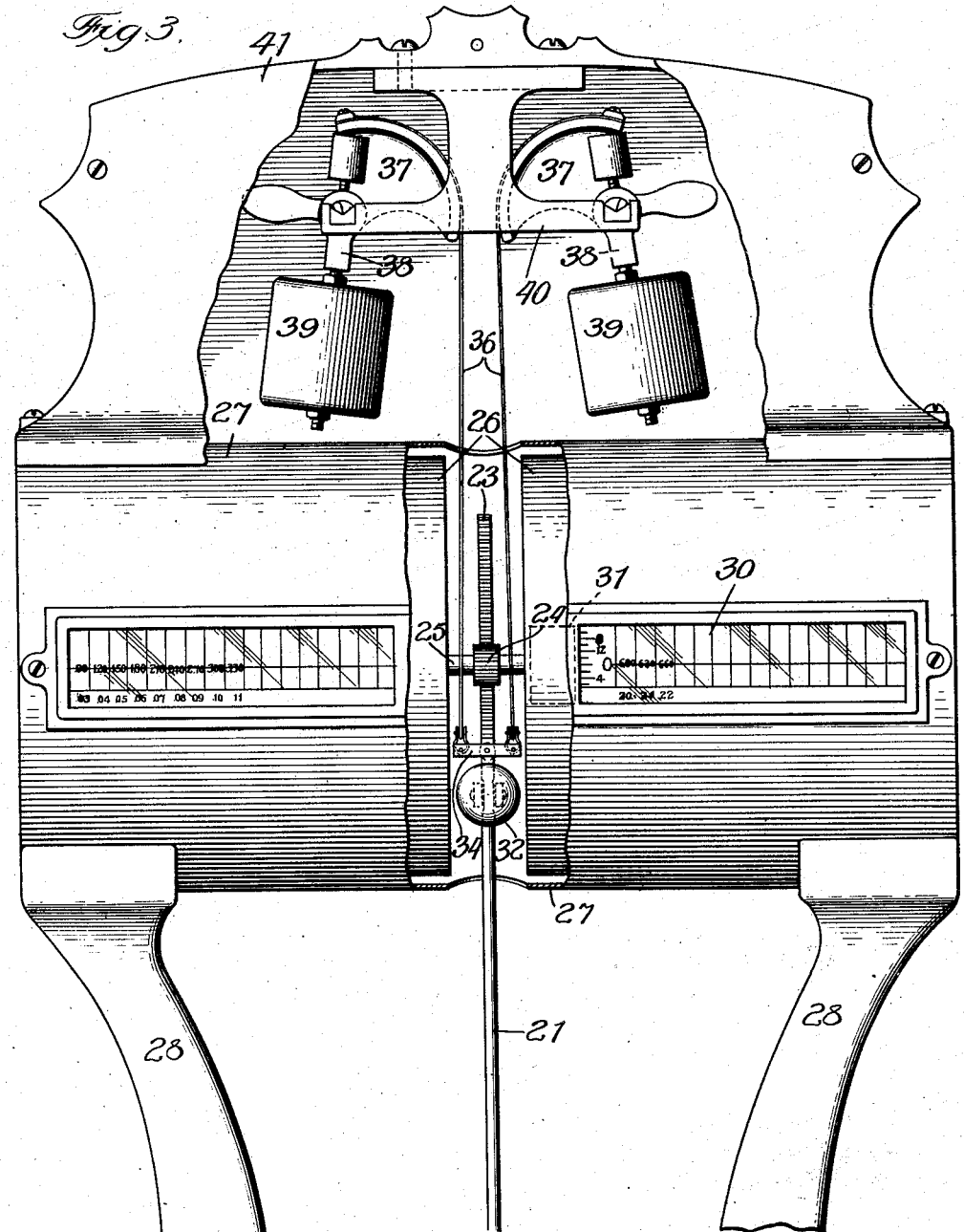

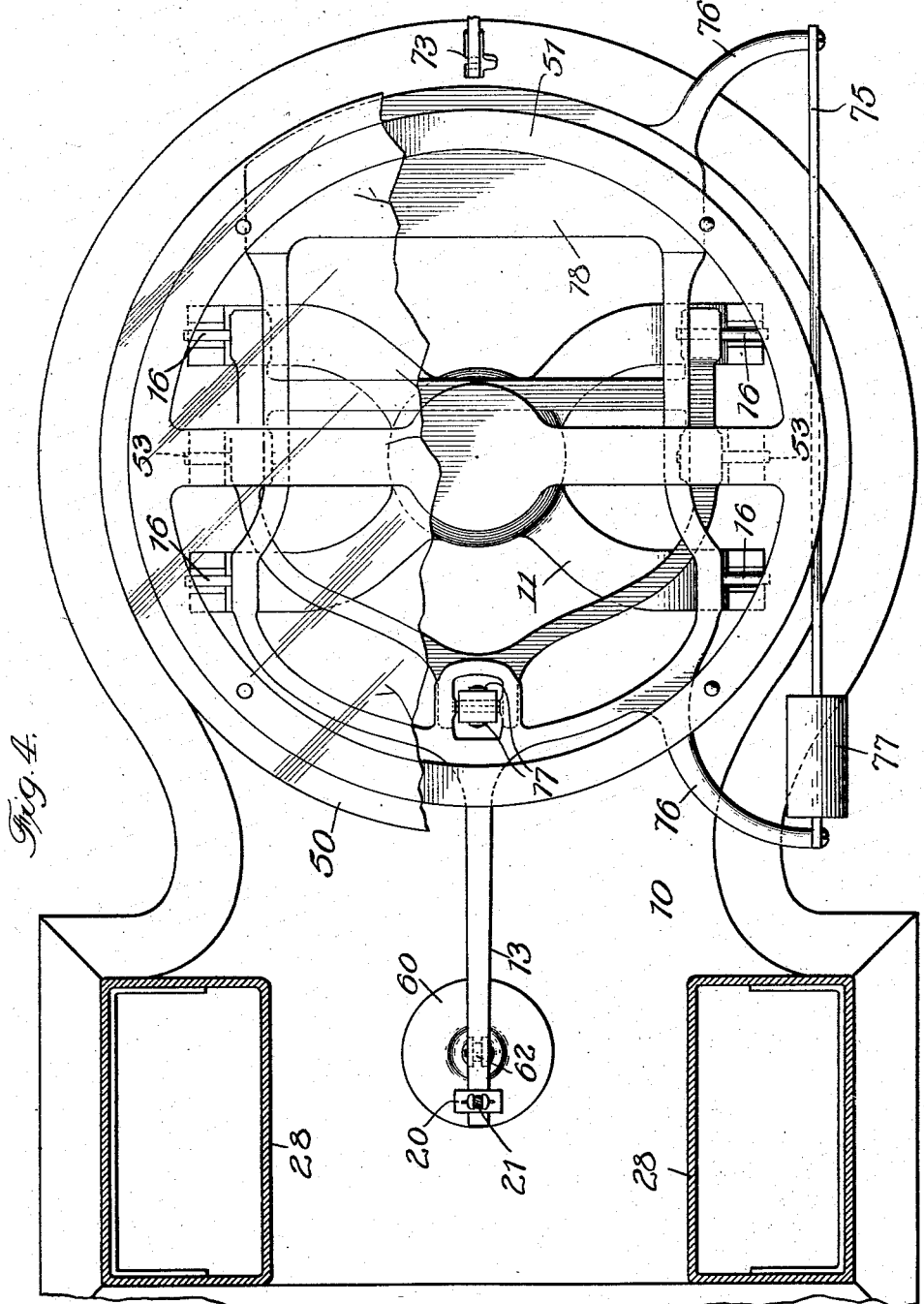

CHARLES G. STRUBLER, OF ELKHART, INDIANA, ASSIGNOR TO STRUBLER COMPUTING SCALE COMPANY, OF ELKHART, INDIANA, A CORPORATION OF INDIANA.

PLATFORM COMPUTING-SCALE.

1,213,294.

Specification of Letters Patent.

Patented Jan. 23, 1917.

Application filed February 14, 1912. Serial No. 677,574.

*To all whom it may concern:*

Be it known that I, CHARLES G. STRUBLER, a citizen of the United States, and a resident of Elkhart, in the county of Elkhart and State of Indiana, have invented certain new and useful Improvements in Platform Computing-Scales; and I do hereby declare that the following is a full, clear, and exact description thereof, reference being had to the accompanying drawings, and to the characters of reference marked thereon, which form a part of this specification.

My invention relates to improvements in weighing and price computing scales of the gravity operated type such as have a rotating weight and price cylinder inclosed in an outer casing, preferably having sight openings, for the dealer and customer, through the former of which can be read the total computed value at a given price, and through latter of which may be exposed to the customer's view the total weight value.

The object of my invention is to increase the capacity of scales of this type; to provide a novel construction and arrangement of load counter-balancing or counter-poising elements, and to equalize and modify the effect of the counter-balancing elements on the weight and price cylinder, thereby increasing its sensibility.

It has for its further object novel details of construction and combinations and arrangements of parts, all as hereinafter and more fully described and particularly pointed out in the claims.

In the accompanying drawings,—Figure 1 is a view partly in vertical section and partly in elevation of a scale made in accordance with and embodying my invention. Fig. 2 is a plan section of line 2 of Fig. 1. Fig. 3 is a front elevation of the upper part of the scale, with parts broken away. Fig. 4 is a plan view of the lower parts of the scale with part of the platform partly broken away. Fig. 5 is a fragmentary view of the rear part of the cylinder casing, showing the sight opening through which the customer may read the weight scale.

As shown in said drawings 10, is the scale base and 11 a fulcrum stand supported thereon, and 12 and 13 are primary and secondary scale beams fulcrumed on said stand. In accordance with one feature of the invention the stand is provided with two pairs of bearings, one pair at the front and the other at the rear thereof, and the beams 12 and 13 are bifurcated as shown in Fig. 4, and the arms of said beams are equipped with the knife bearing pivots 16, 16 to engage the bearings on the stand and the beams are connected to each other by the link 17. The main beam is counterweighted at 18 at its outer end and it is connected at 20 to the draw bar 21 that extends upwardly for connection with the extension 22 of the rack 23, which meshes with a pinion 24 that is fixed to the shaft 25 of the rotative weight and price bearing chart or charts 26. The shaft 25 of the said charts or cylinders has rotative bearing (in a manner not shown) at the end walls of a casing 27 which incloses said cylinders in a familiar manner, and is supported on the upper ends of standards 28 that rise from the base 10. The said casing 27 is provided with the usual elongated front opening 30 and the rear sight opening 31, through which the salesman and customer may read the total computed values and the total weight values, respectively.

The rack bar extension 22 is provided at its free end with a weight 32, and between its end with an upstanding stud 33 to which is centrally pivoted an evener bar 34.

36, 36 designate straps or tapes which are connected at their lower ends to the evener bar 34 and are trained at their upper ends about and are fixed to the eccentric segmental ends 37 of weighted, load counter-poise levers or pendulums 38, the weights 39 being adjustably mounted on said levers, as best shown in Fig. 3. The said load counter-poise levers 38 are pivoted, as by the knife edge pivots shown, to a bracket 40 that is mounted in a casing 41 which is attached to and rises from the cylinder casing 27. As herein shown the bracket is attached to and depends from the top wall of said casing.

The arrangement of the load counter-poise levers 38 above the cylinder and above the scale beams, as shown, renders the action of the scale extremely sensitive for the reason that the tapes 36 are of such length that the pull thereof on the pendulum levers is always a direct one and there is no tendency of binding of the parts. Furthermore the provision of the pair or plurality of load counter-poise levers 38, arranged as shown, and connected by the evener in the manner described, has a self-compensating action, such as to avoid unbalancing the cylinders 26 when the scale is at rest and when resting on a support that is not level. Thus, when resting on a non-level support, such as would tend or act to change the position of the load counter-poise levers, the increase of leverage exerted by one lever will be compensated by a decrease of leverage exerted by the other lever, so that the zero or initial position of the cylinder will not be changed. This feature of my invention may be embraced in a construction wherein the load counter-poise levers are not located above the cylinder, but may be located below said cylinder or below the scale beam or beams.

The scale platform 50, which may be made of glass or like material, is supported by a sub-base 51, which has standards 52 that are supported, as by the laterally separated knife edge bearings 53 shown in Fig. 1, on the primary scale beam 12 between its pivot 16 and the link 17. The said platform sub-base has a depending steadying rod or stud 55 which is anchored at its lower end by the link 56 to a stud 57 depending from the top wall of the scale base.

In order to avoid vibration of the beam and draw bar I may provide a steadying device shown in Fig. 1, and made as follows: 60 designates a vertical cylinder adapted to contain oil or the like, 61 designates a piston within the cylinder made of somewhat less diameter than the cylinder and the piston is connected to the secondary beam 13 by the rod or stem 62. With this construction, and with the cylinder filled with a liquid, there is provided a steadying or dampening means which gives stability of movement to the scale mechanism and which avoids vibration of the cylinder and parts connected therewith.

65 designates a weighted member within the hollow scale base that has a shank 66 which is pivoted at 67 to a bracket 68 that depends from the top wall of the base. The said weighted member has an extension or hand piece 69, that extends forwardly through an opening 70 in the front wall of the base.

71 designates a link that depends from the outer weighted end of the beam 13 and is formed at its lower end with a vertical slot 72 through which the extension 69 projects.

The weighted member is locked in a normal upper position by engagement of its extension 69 with a tooth or lug 73 on the side wall of the slot or opening 70, and is shown in Fig. 1 in its uppermost position. the weighted member being thus supported free from the lower wall of the slot in the link 71. When the extension 69 is released from the tooth or lug 73, it drops upon the bottom of the slot 72 of the link 71, whereupon the weight of the member 65 is added to the outer end of the secondary scale beam 13 in a manner to resist the downward movement of the scale platform, and thereby increase the capacity of the scale to indicate total weight values. The weighted member 65 may increase the capacity of the scale to any practicable number of pounds desired. In addition to said weighted member 65, and coöperating therewith, if desired, I may provide the following graduated capacity increasing device: 75 designates a horizontal rod or bar that is attached to the laterally extending arms 76 of the secondary scale beam 13. Mounted on said bar to slide endwise thereof is a weight 77. The bar 75 may be graduated, and the weight may be moved therealong to a greater or less extent so as to thereby gradually increase the capacity of the scale to indicate weight values. Moreover the weight 77 and the bar 75 may be used in lieu of a tare beam by which to account for a known tare of a commodity being weighed.

It will be understood that the embodiment of my invention is capable of variations within the scope and spirit of the invention, and that the invention is not limited to the structural details shown, except as hereinafter made the subject of specific claims or as imposed by the prior art. For instance certain features of the invention may be adapted to types of scales having other forms of weight and price determining members.

What I claim as new is—

1. In a computing scale, a load receiving platform, a pivoted scale beam supporting said platform, a draw bar connected to the scale beam, a rack bar connected to said draw bar, a rotatable weight and price chart, a pinion thereon meshing with said rack bar, and equalizing and load counterpoise pendulum means mounted above the axis of the chart and connected to the chart operating means by flexible bands which extend from points below said axis to said pendulum means.

2. In a computing scale, a load supporting structure, a rotatable weight and price chart, a supporting shaft therefor, a plurality of pendulum levers having knife edge pivots and having means of support above said chart, a draw bar and rack bar connecting said load supporting structure with said chart to operate the latter, and connections between said pendulums and chart and the load supporting structure, embracing an evener bar and flexible connections between the evener bar below the axis of said chart and pendulums.

3. In a computing scale, a load supporting structure, a rotatable weight and price chart, operative connections between the supporting structure and chart embracing a rack bar connected with said structure and a pinion on the chart meshing with the rack bar, compensating pendulum levers having means to support the same above the chart and operative connections between said rack bar and said pendulum levers, connected to the rack bar at a point below the axis of said chart.

4. In a computing scale, a load supporting structure, a rotatable weight and price chart, operative connections between the supporting structure and chart, embracing a draw bar and rack connected with said structure and a pinion on the chart meshing with the rack, a plurality of compensating pendulum levers above said pinion provided with knife-edge pivots and eccentric segmental portions, tapes trained about and attached to said segmental portions, and an evener below said pinion to which the tapes are connected.

5. In a computing scale, a base, a rotatable weight and price chart, a load supporting structure, comprising a scale beam, with means to operatively connect it to said chart, load counterpoising and equalizing weights above the chart, with means to also operatively connect the same to said chart, a supplemental weight pivoted to the scale base and having means to normally sustain it free from the scale beam, and means whereby said weight may be supported on the scale beam to increase the capacity of the scale.

6. In a computing scale, a rotatable weight and price chart, a load supporting structure embracing a scale beam with means to operatively connect it to said chart by a loose or pivotal connection below the axis of said chart, and a pivoted load counterpoising weight located above said chart with means to operatively connect it to said chart and to said load supporting structure.

7. In a computing scale, a rotatable weight and price chart, a load supporting structure, comprising a scale beam operatively connected to said chart, a load counter-poising weight also operatively connected to said chart, a supplemental weight pivotally supported under the scale base and having means to normally sustain it on the scale base free from the scale beam, and a slotted member depending from the scale-beam through which the supplemental weight extends and by which it is supported when released from the scale base.

8. In a computing scale, a rotatable weight and price computing chart having a pinion, a pendulum lever having a knife edge pivot, said lever having movement in a plane transverse to that of the scale beam, a supporting fulcrum for said pendulum pivot mounted on the frame of the scale at a point above the computing chart, bands trained about and fixed to said lever and trained downward to one side of the axis of the rotatable chart, an evener, a draw bar and a rack to which the evener is connected, said rack meshing with the pinion on the chart, a load support and a scale beam supporting the same and connected to the draw bar.

9. In a computing scale, a base, a supporting fulcrum stand on said base, multiple scale beams operatively connected and carried by said stand, a load platform pivotally supported on one of said beams, a support rising from the base, a cylindric casing sustained on said support, said casing having sight openings on the front and rear thereof, a rotative weight and price chart contained in said casing, a bracket mounted on a part of the casing above said chart, gravity levers carried by said bracket, bands attached at their upper ends to said levers, an evener to which the lower ends of the bands are attached, a draw bar to the upper end of which the evener is connected, the lower end thereof being connected to one of said multiple scale beams, a rack connected also to the draw bar and a pinion carried by the chart and meshing with the rack.

10. In a computing scale, a pivoted scale beam, a load carrier supported thereon, a chart member and a coöperating indicating member above the load carrier, one of which members is rotative relatively to the other, a draw bar connected to the scale beam and to said rotative member at a point below the axis of the latter, and equalizing and load counter-poise pendulum means above said chart member and operatively connected to the movable member through said draw bar.

11. In a computing scale, a housing, gravity levers mounted in said housing, a drum supporting frame below said housing, a price and weight chart mounted in said supporting frame, a rack bar and drum pinion operatively connected, a stirrup, a draw bar and evener, with flexible means to connect the evener to the gravity levers, a dash pot, a dash pot plunger pivotally connected with a lever, a standard surrounding the draw bar and rack bar, a casing surrounding the price and weight chart, sight openings in both sides of the said casing, registering wires in said openings, a base, a load supporting platform, operatively connected, all substantially as shown and described.

12. In a computing scale, a rotatable weight and price chart and its operating pinion, a load supporting structure embracing a scale beam, a dash pot operatively connected to said beam, gravity counterpoise levers above the price chart, connections between the scale beam and said gravity levers embracing flexible members attached to the gravity levers, and a rack bar operatively connected to said pinion and scale beam, for the purpose shown and described.

13. In a computing scale, load supporting means, a rotatable weight and price chart above the load supporting means, twin gravity levers pivotally mounted above said chart and flexible bands operatively attached to said levers and extending below the axis of the price chart, with means to connect them to the load supporting means.

14. In a computing scale, a rotative weight and price chart, load counterpoising means embracing counterpoising levers above the price chart and a scale beam, a dash pot and a dash pot plunger operatively connected to said beam and, therethrough, to said counterpoising levers, substantially as and for the purpose set forth.

15. In a computing scale, a rotatable weight and price determining member, a load supporting structure embracing a scale beam, operative connections between said beam and said member embracing a loose or pivotal connection below the rotative axis of said member, and a pivoted load counterpoising weight above said axis, with flexible means to operatively connect it to said beam.

16. In a computing scale, a rotatable weight and price determining member, a load supporting structure embracing a scale beam, a pinion on the axis of rotation of said member, a rack meshing with said pinion, means to connect said beam to said rack at a point below said pinion, and a pivoted load counterpoising weight above said pinion, with means to operatively connect it to said rack below said pinion.

17. In a computing scale, a rotatable weight and price determining member, a load supporting structure embracing a scale beam, a pinion on the axis of rotation of said member, a rack meshing with said pinion, means to connect said beam to said rack at a point below said pinion, a pivoted load counterpoising weight above said pinion, and a lever connected to said weight and formed with an eccentric periphery and connected to said rack bar.

18. In a computing scale, a rotatable weight and price determining member, a load supporting structure embracing a scale beam, a pinion on the axis of rotation of said member, a rack meshing with said pinion provided at its lower end with a weighted arm to hold the rack in mesh with said pinion, a connection between said scale beam and said arm, a pivoted load counterpoising weight above said pinion provided with a lever having a periphery eccentric to the pivotal axis of said weight, and a flexible band connected between said lever and said arm and trained about said eccentric periphery.

19. In a computing scale, a rotatable weight and price determining member, a load supporting structure, embracing a scale beam, a pinion on the axis of rotation of said member, a rack meshing with said pinion, a pivoted load counterpoising weight and separate connecting means respectively connecting said rack bar to said scale beam and to said weight, said connecting means being alined with each other.

20. In a computing scale, a rotatable weight and price determining member, a load supporting structure embracing a scale beam, a pinion on the axis of rotation of said member, a rack meshing with said pinion provided at its lower end with a weighted arm to hold the rack in mesh with said pinion, a connection between said scale beam and said arm, a pivoted load counterpoising weight above said pinion provided with a lever having a periphery eccentric to the pivotal axis of said weight, a flexible band to connect said lever and arm and trained about said eccentric periphery, a dash pot, and a dash pot plunger connected to said beam.

21. In a computing scale, two spaced rotative weight and price chart drums, a load supporting structure embracing a scale beam, a counterpoise weight above the axis of said drums and operative connections between said drums and said beam and weight, respectively connected to the drums in the space between said drums.

22. In a computing scale, two spaced rotative weight and price chart drums, a load supporting structure embracing a scale beam, a counterpoise weight above the axis of said drums, a support therefor, a shaft disposed axially of said drums, a pinion on the shaft between the drums, a rack between the drums engaging said pinion, a connection between the rack and said beam and a flexible means between the drums to connect said rack to said counterpoise weight.

23. In a computing scale, a rotatable weight and price determining member, a pivoted scale beam, a load support, a connection between the scale beam and said member to rotate the latter, a pivoted counterpoising weight above said member arranged to swing in a plane at a right angle to the plane of pivotal movement of said scale beam and a connection between said weight and said member.

24. In a computing scale, a rotatable weight and price determining member, a pivoted scale beam, a load support, a connection between the scale beam and rotatable member to rotate the latter, two weighted counterpoising levers above said rotatable member and having opposing eccentric peripheries and swingable in a plane at a right angle to the plane of pivotal movement of the beam and flexible bands to connect said levers and said member and trained over said eccentric peripheries.

In testimony that I claim the foregoing as my invention I affix my signature in the presence of two witnesses, this 3rd day of February, A. D. 1912.

CHARLES G. STRUBLER.

Witnesses:
GRACE A. SOUTHWELL,
WILLIAM L. HALL.